US010036339B2

(12) United States Patent
Evaldsson et al.

(10) Patent No.: US 10,036,339 B2
(45) Date of Patent: Jul. 31, 2018

(54) CONTROL OF A TORQUE DEMANDED FROM AN ENGINE (71) Applicant: SCANIA CV AB, Södertälje (SE)

(72) Inventors: Martin Evaldsson, Nacka (SE); Karl Redbrandt, Solna (SE)

(73) Assignee: SCANIA CV AB (SE)

( * ) Notice: Subject to any disclaimer, the term of this patent is extended or adjusted under 35 U.S.C. 154(b) by 13 days.

(21) Appl. No.: 15/313,840

(22) PCT Filed: May 27, 2015

(86) PCT No.: PCT/SE2015/050612
§ 371 (c)(1),
(2) Date: Nov. 23, 2016

(87) PCT Pub. No.: WO2015/183169
PCT Pub. Date: Dec. 3, 2015

(65) Prior Publication Data
US 2017/0184039 A1    Jun. 29, 2017

(30) Foreign Application Priority Data

May 30, 2014    (SE) ...................................... 1450652

(51) Int. Cl.
F02D 11/10    (2006.01)
F02D 41/02    (2006.01)
(Continued)

(52) U.S. Cl.
CPC ........ *F02D 41/0225* (2013.01); *F02D 11/105* (2013.01); *F02D 41/021* (2013.01);
(Continued)

(58) Field of Classification Search
CPC .... F02D 41/0225; F02D 41/107; F02D 41/26; F02D 41/022; F02D 41/021; F02D 41/10;
(Continued)

(56) References Cited

U.S. PATENT DOCUMENTS

2004/0107034 A1* 6/2004 Togai .................... B60K 26/04
701/54
2004/0127326 A1* 7/2004 Tajima .................. B60K 6/485
477/3

(Continued)

FOREIGN PATENT DOCUMENTS

DE    10 2008 052058 B3    11/2009
WO    WO 2011/154234 A1    12/2011

OTHER PUBLICATIONS

International Search Report and Written Opinion of the International Searching Authority dated Oct. 8, 2015 in corresponding International Application No. PCT/SE2015/050612 (11 total pages).

(Continued)

*Primary Examiner* — Lindsay Low
*Assistant Examiner* — George Jin
(74) *Attorney, Agent, or Firm* — Ostrolenk Faber LLP (57) ABSTRACT A method and a system for control of a torque $Tq_{demand}$ requested from an engine in a vehicle, wherein the engine provides a dynamic torque $Tq_{fw}$ in response to the torque $Tq_{demand}$. Control of the requested torque $Tq_{demand}$ is performed such that the control provides a desired value $Tq_{fw\_req}$ for the dynamic torque and/or a desired derivative $Tq_{fw\_req}$ for the dynamic torque. This is achieved by basing the control on at least one current value $Tq_{fw\_pres}$ for the dynamic torque, on one or several of the desired value $Tq_{fw\_req}$ and the desired derivative $Tq_{fw\_req}$ for the dynamic torque, and on a total delay time $t_{delay-total}$ elapsing from determination of at least one parameter value, to when a change of the dynamic torque $Tq_{fw}$ based on the determined at least one parameter value, has been effected.

19 Claims, 7 Drawing Sheets (51) Int. Cl.
*F16H 63/50* (2006.01)
*F02D 41/10* (2006.01)
*F02D 41/26* (2006.01)

(52) U.S. Cl.
CPC ......... *F02D 41/022* (2013.01); *F02D 41/107* (2013.01); *F02D 41/26* (2013.01); *F16H 63/502* (2013.01); *F02D 2200/1002* (2013.01); *F16H 2063/506* (2013.01)

(58) Field of Classification Search
CPC ............. F02D 41/1401; F02D 41/0215; F02D 41/023; F02D 2200/1002; F02D 2200/1004; F02D 2200/10; F02D 2041/1431; F02D 2041/1433; F02D 11/105; F02D 2250/18; F02D 2250/21; F02D 2250/28; F16H 63/502; F16H 2063/506
See application file for complete search history.

(56) References Cited

U.S. PATENT DOCUMENTS

| | | | |
|---|---|---|---|
| 2007/0254772 A1* | 11/2007 | Satou | F02D 41/123 477/107 |
| 2010/0274460 A1* | 10/2010 | Kuwahara | F02D 11/105 701/99 |
| 2014/0288758 A1* | 9/2014 | Suzuki | B60L 15/2009 701/22 |

OTHER PUBLICATIONS

M. Berriri, et al., "Active Damping of Automotive Powertrain Oscillations by a Partial Torque Compensator," Pergamon Press, Oxford, GB, Control Engineering Practice, vol. 16, No. 7, Jul. 1, 2008, pp. 874-883.
International Search Report dated Sep. 28, 2015 issued in corresponding International patent application No. PCT/SE2015/050612.

* cited by examiner

CONTROL OF A TORQUE DEMANDED FROM AN ENGINE

CROSS-REFERENCE TO RELATED APPLICATIONS

The present application is a 35 U.S.C. §§ 371 national phase conversion of PCT/SE2015/050612, filed May 27, 2015, which claims priority of Swedish Patent Application No. 1450652-1, filed May 30, 2014, the contents of which are incorporated by reference herein. The PCT International Application was published in the English language.

TECHNICAL FIELD

The present invention relates to a system arranged for the control of a torque $Tq_{demand}$ requested from an engine. The present invention also relates to a method for the control of a torque $Tq_{demand}$ requested from an engine, and a computer program and a computer program product, which implement the method according to the invention.

BACKGROUND

The following background description constitutes a description of the background to the present invention, which does not, however, necessarily constitute prior art.

Vehicles, such as for example cars, buses and trucks are driven forward by an engine torque produced by an engine in the vehicle. This engine torque is provided to the vehicle's driving wheels through a powertrain in the vehicle. The powertrain contains a range of inertias, torsional compliances and damping components. This means that the powertrain, to a varying degree, may have an impact on the engine torque being transferred to the driving wheels. Thus, the powertrain has a torsional compliance/flexibility and a play, which means that oscillations in torque and/or revolutions, so called powertrain oscillations, may occur in the vehicle when the vehicle, for example, sets off once a torque has been requested from the engine. These oscillations in torque and/or revolutions occur when forces, having been built up in the powertrain in the period between the engine providing the torque and the vehicle moving off, are released as the vehicle moves off. Powertrain oscillations may make the vehicle rock longitudinally, which is described in further detail below. These rocking movements in the vehicle are very disruptive for the driver of the vehicle.

Therefore, in some prior art solutions for avoiding these powertrain oscillations, preventive strategies have been used at the request of the engine torque. Such strategies may utilize limiting torque ramps when the engine torque is requested, whereat these torque ramps have been adapted so that the requested engine torque is limited in such, that the powertrain oscillations are reduced, or do not occur at all.

The torque ramps that are used today when an engine torque is requested thus introduce a limit to how the torque may be requested from the engine in the vehicle. This limitation is necessary under the solutions of prior art, in order to reduce the disruptive powertrain oscillations. Allowing the driver and/or, for example, a cruise control to freely to request a torque would, with current art systems, often give rise to considerable and disruptive powertrain oscillations, which is why limiting torque ramps are used.

The limiting torque ramps in current art are normally static. Static torque ramps, which may also be termed static torques, have an advantage in that they are of a very limited complexity, which is one of the reasons why they are so often used. However, static torque ramps have a number of disadvantages, relating to the fact that they are not optimized to all driving events to which the vehicle may be exposed. For certain driving modes, the static and limiting torque ramps give rise to a reduction in vehicle performance, as, due to the torque ramp, the requested torque is unnecessarily low for driving modes, wherein it would have been possible to request more engine torque without the occurrence of powertrain oscillations. For other driving modes, the torque ramp does not limit the requested torque sufficiently, which means that powertrain oscillations occur and therefore rocking movements in the vehicle. Therefore, the use of torque ramps, for certain driving modes, provides non-optimal torques, which may give rise to an unnecessary reduction in vehicle performance and/or rocking that reduces the comfort, caused by powertrain oscillations.

BRIEF DESCRIPTION OF THE INVENTION

It is therefore one objective of the present invention to provide a method and a system for control of a requested torque $Tq_{demand}$, which at least partly solves these problems.

This objective is achieved through the system and the method and the above mentioned computer program and computer program product disclosed herein.

The present invention relates to the control of a torque $Tq_{demand}$ requested from the engine, whereat the engine provides a dynamic torque $Tq_{fw}$ in response to a torque $Tq_{demand}$ requested from the engine. The dynamic torque $Tq_{fw}$ is the torque at the flywheel, which connects the engine to its output shaft and which, through a gear ratio i is related to a dynamic wheel torque $Tq_{wheel}$ for the powertrain, which is supplied to the driving wheels of the vehicle. The gear ratio i here constitutes the total gear ratio of the powertrain, comprising for example the gearbox ratio for a specific gear. According to the present invention, the control of the requested torque $Tq_{demand}$ is carried out in such a way that the control provides a desired value $Tq_{fw\_req}$ for the dynamic torque, and/or a desired derivative $\dot{Tq}_{fw\_ref}$ for the dynamic torque. This is achieved by way of the control being based on at least one current value $Tq_{fw\_pres}$ for the dynamic torque, on one or several of the desired value $Tq_{fw\_req}$ and the desired derivative $\dot{Tq}_{fw\_req}$ for the dynamic torque, and on a total delay time $t_{delay\_total}$ required from a determination of at least one parameter value until a change of said dynamic torque $Tq_{fw}$, based on the determined at least one parameter value, has been completed.

The parameter value is related to one of the variables impacting the dynamic torque. When the dynamic torque changes, this is achieved by way of change of a parameter. The parameter in turn impacts the powertrain, so that the dynamic torque eventually changes. The parameter may, for example, be the engine's speed or the wheel speed, alternatively corresponding accelerations, or the flywheel torque.

According to the present invention, the profile of the requested torque $Tq_{demand}$ is formed in such a manner that the dynamic torque $Tq_{fw}$ has an, at least in part, substantially even and non-oscillating profile, or does at least provide oscillations with significantly lower amplitudes than prior art. The present invention results in oscillations, which do not have a negative impact on the comfort in the vehicle.

According to the present invention, the total delay time $t_{delay\_total}$ is considered when performing the controlling. This makes the control more exact and reliable, as the regulator according to the invention is aware that it will take a period equal to the delay time $t_{delay\_total}$, before a measure impacts the control. The control may then execute each measure at exactly the point in time when it is needed, in order to optimally adjust the requested torque $Tq_{demand}$. In other words, the awareness of the delay time is used, in order to more exactly and at the right time be able to perform controlling of the requested torque $Tq_{demand}$.

In this way, powertrain oscillations may be reduced in number and/or size for a number of driving modes, wherein previous controls of the requested torque $Tq_{demand}$ would have resulted in problematic rocking of the vehicle. These driving modes comprise a commencement of a request for a torque from the engine, a so-called "TIPIN" and a ceasing of a request for a torque from the engine, a so-called "TIPOUT". The present invention also reduces powertrain oscillations for driving modes comprising a play in the powertrain—in other words when, for example, the cogs of two cogwheels in the gearbox for a brief period of time do not engage, in order to later engage again, which may, for example, occur in the transition between dragging the engine and acceleration/request of torque, when engaging the clutch, or during shift operation. Therefore, for all these driving modes the present invention may prevent rocking of the vehicle caused by powertrain oscillations, whereby the driver's comfort is increased.

Powertrain oscillations caused by external impact, for example caused by a bump in the road, may also quickly be reduced and/or damped with the present invention.

Furthermore, the use of the present invention also provides a significant reduction in the wear of the powertrain of the vehicle. The reduction in the wear, achieved by the invention, provides an extended life for the powertrain, which of course is advantageous.

BRIEF DESCRIPTION OF THE DRAWINGS

The invention will be illustrated in more detail below, along with the enclosed drawings, where similar references are used for similar parts, and where.

DESCRIPTION OF PREFERRED
EMBODIMENTS

Figure 1:
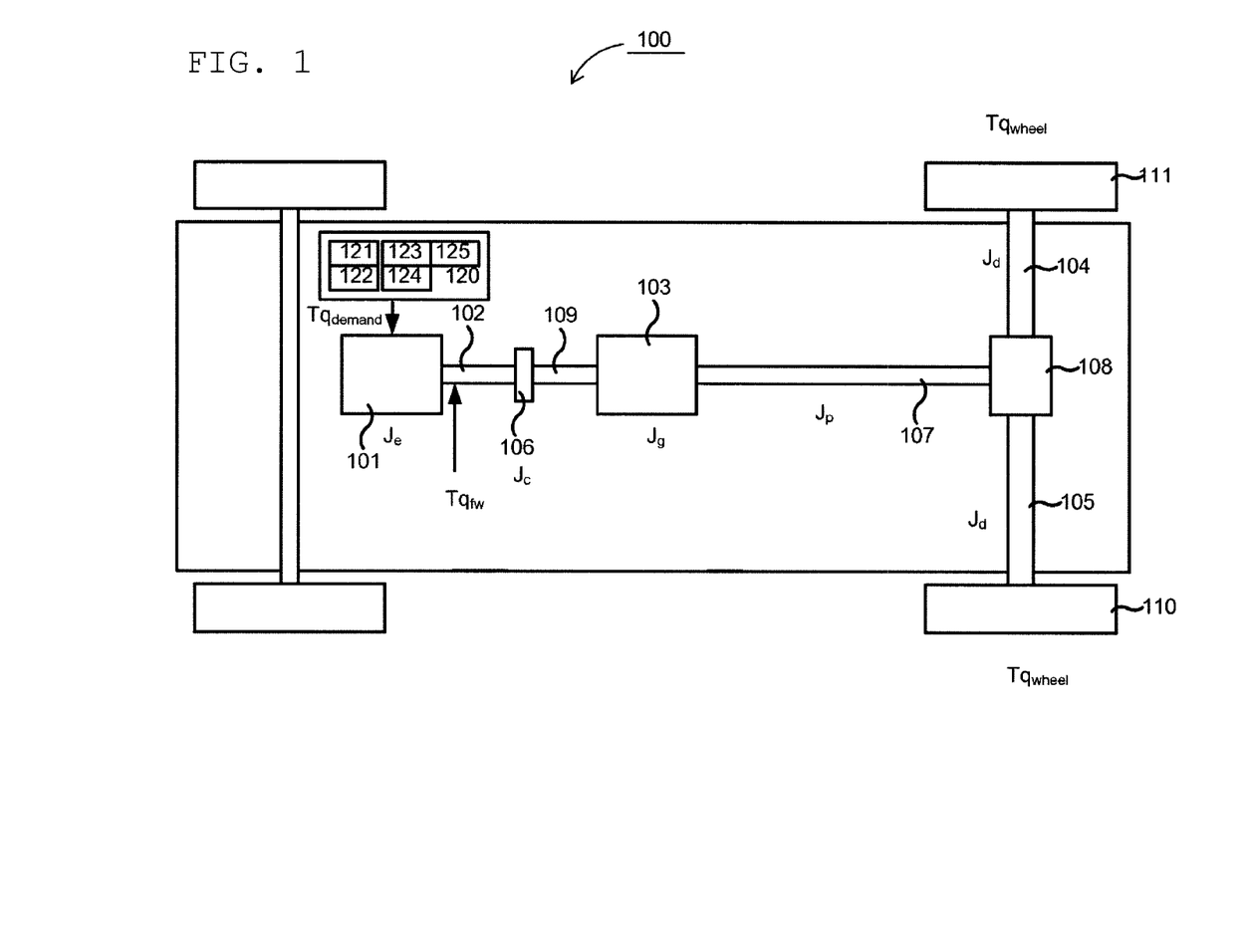
FIG. 1 schematically shows an example of a vehicle in which the invention is present.

FIG. 1 schematically shows a heavy example vehicle 100, such as a truck, a bus or similar, which will be used to explain the present invention. The present invention is, however, not limited to use in heavy goods vehicles, but may also be used in lighter vehicles such as cars. The vehicle 100 shown schematically in FIG. 1 comprises a pair of driving wheels 110, 111. The vehicle furthermore comprises a powertrain with an engine 101, which may be for example a combustion engine, an electrical motor or a combination of these, a so called hybrid. The engine 101 may, for example, in a customary fashion, via an output shaft 102 on the engine 101, be connected with a gearbox 103, possibly via a clutch 106 and an input shaft 109 connected to the gearbox 103. An output shaft 107 from the gearbox 103, also known as a propeller shaft, drives the driving wheels 110, 111 via a final gear 108, such as e.g. a customary differential, and drive shafts 104, 105 connected with said final gear 108. A control device 120 is schematically illustrated as providing control signals to the engine 101. As described below, the control device may comprise a first 121, a second 122, a third 123, and a fourth 124 determining device and an execution device 125. These devices are described in more detail below.

When a driver of the motor vehicle 100 increases a torque request to the engine 101, for example by inputting via an input means, such as the depressing an accelerator pedal, this may result in a relatively rapid change in the powertrain's torque. This torque is resisted by the driving wheels 110, 111, due to their friction against the ground and the rolling resistance of the motor vehicle. The drive shafts 104, 105 are hereby exposed to a relatively powerful torque.

For reasons of cost and weight, among others, the drive shafts 104, 105 are not normally dimensioned to handle this severe stress without being impacted. In other words, the drive shafts 104, 105 have a relatively great torsional compliance. The propeller shaft 107 may also have a relatively great torsional compliance. The other components of the drive shaft may also have some form of torsional compliance. Due to the relative torsional compliance of the drive shafts 104, 105, they act as torsion springs between the drive shafts 110, 111 and the final gear 108. In the same way, the other torsional compliances in the powertrain also act as torsion springs between the location of the various components and the driving wheels 110, 111. Once the rolling resistance of the vehicle no longer holds back the torque from the powertrain, the motor vehicle 100 will start to roll, whereby the force in the drive shafts 104, 105 acting as a torsion spring will be released. When the motor vehicle 100 starts to set off, this released force may cause powertrain oscillations, meaning that the motor vehicle starts to rock in a longitudinal direction, i.e. in the driving direction. The driver of the motor vehicle experiences this rocking as very uncomfortable. A driver desires a soft and comfortable driving experience and when such a comfortable driving experience is achieved, this gives a sense of the motor vehicle being a refined and well developed product. Therefore, uncomfortable powertrain oscillations should if possible be avoided.

The present invention relates to the control of a torque requested from the engine 101 $Tq_{demand}$. The engine 101 provides a dynamic torque $Tq_{fw}$ in response to a torque $Tq_{demand}$ requested from the engine, whereat this dynamic torque $Tq_{fw}$ constitutes a torque at the flywheel connecting the engine 101 to its output shaft 102. This dynamic torque is the torque $Tq_{fw}$, which, through a gear ratio i for the powertrain, relates to a dynamic wheel torque $Tq_{wheel}$, supplied to the driving wheels 110, 111 of the vehicle. The gear ratio i here constitutes the total gear ratio of the powertrain, comprising the gearbox ratio for a current gear. In other words, a requested engine torque $Tq_{demand}$ results in a dynamic wheel torque $Tq_{wheel}$ at the vehicle's driving wheels 110, 111.

According to the present invention, the control of the requested torque is carried out $Tq_{demand}$ in such a way that the control provides a desired value $Tq_{fw\_req}$ for the dynamic torque, and/or a desired derivative $\dot{Tq}_{fw\_req}$ for the dynamic torque. This is achieved by basing the control on at least one current value $Tq_{fw\_pres}$ for the dynamic torque, on one or several of the desired value $Tq_{fw\_req}$ and the desired derivative $\dot{T}q_{fw\_req}$ for the dynamic torque, and on a total delay time $t_{delay\_total}$ required from a determination of at least one parameter value until a change of the dynamic torque $Tq_{fw}$, based on the determined at least one parameter value, is completed. The determination of the parameter value may here, for example, comprise at least one measurement and/or at least one estimation of this parameter value.

The control may be carried out by a system arranged for the control of the requested torque $Tq_{demand}$, wherein the system comprises an execution device 125, which is arranged to carry out the above described control of the requested torque $Tq_{demand}$, based at least on the current value, $Tq_{fw\_pres}$, on the desired value $Tq_{fw\_req}$ and/or on the desired derivative $\dot{T}q_{fw\_req}$ for the dynamic torque, and on the total delay time $t_{delay\_total}$. The execution device 125 is arranged to provide the desired value $Tq_{fw\_req}$ and/or the desired derivative $\dot{T}q_{fw\_req}$ for the dynamic torque.

According to one embodiment, the system also comprises a first 121, a second 122, and a third 123 determining device, which are arranged to determine the current value $Tq_{fw\_pres}$, the desired value $Tq_{fw\_req}$, and/or the desired derivative $\dot{T}q_{fw\_req}$, and the total delay time, respectively $t_{delay\_total}$. The system also comprises a fourth determining device 124, which is arranged to determine the requested torque $Tq_{demand}$.

A person skilled in the art will also realize that the above system may be modified according to the different embodiments of the method according to the invention.

In addition, the invention relates to a motor vehicle 100, e.g. a car, a truck or a bus, comprising at least a system for the control of the requested torque $Tq_{demand}$ according to the invention.

According to the present invention, the total delay time $t_{delay\_total}$ is considered when performing the control. This means the control is more accurate and reliable since the value for the dynamic torque $Tq_{fw}$ changes over time and since the control may then take into consideration the value that the dynamic torque $Tq_{fw}$ will probably have, when a measure taken will take effect. Thus, for example, a measure may be brought forwards in time with the duration of the delay time $t_{delay\_total}$ compared to prior art control procedures, since the control device knows the delay time will be required $t_{delay\_total}$ before the measure has an impact on the control. Accordingly, if the control is also based on the delay time $t_{delay\_total}$, the respective measures may be implemented at exactly the point in time when they are needed, in order to optimally adjust the requested torque $Tq_{demand}$. In other words, the awareness of the delay time is used, in order to more exactly and at the right time be able to perform controlling of the requested torque $Tq_{demand}$, so that a comfortable and efficient control is achieved. This minimizes powertrain oscillations in the vehicle.

Figure 2:
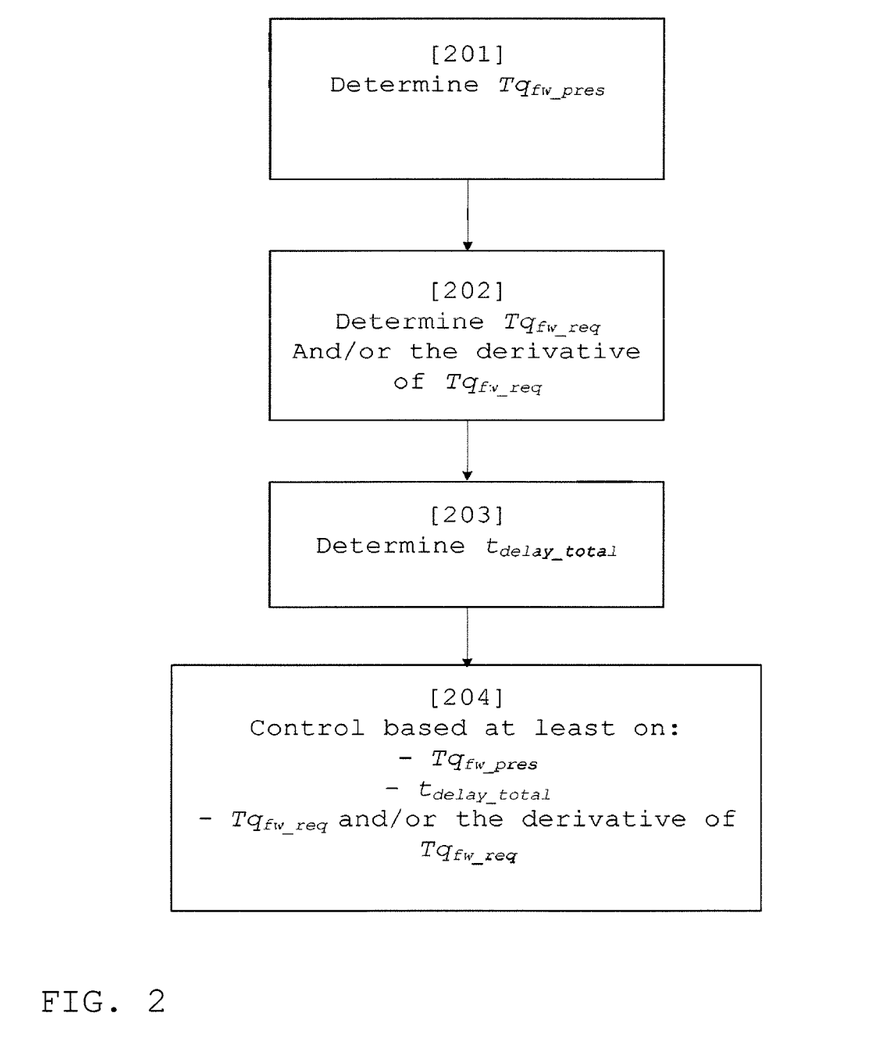
FIG. 2 shows a flow chart for a method according to one embodiment of the present the invention.

FIG. 2 shows a flow chart for a method according to one embodiment of the present the invention.

In a first step 201, a current value $Tq_{fw\_pres}$ for the dynamic torque is determined, for example by means of a first determining device 121.

In a second step 202, one or several of a desired value $Tq_{fw\_req}$ and a desired derivative $\dot{T}q_{fw\_req}$ for the dynamic torque is determined, for example with the use of a second determining device 122.

In a third step 203, a total delay time $t_{delay\_total}$ required, from the determining of at least one parameter value until a change in the dynamic torque $Tq_{fw}$ is completed, is determined, for example with the use of a third determining device 123, wherein the change is based on the determined at least one parameter value.

In a fourth step 204, a control of the requested torque $Tq_{demand}$ is performed, for example with the use of a fourth determining device 124 and an execution device 125, based at least on the determined current value $Tq_{fw\_pres}$ for the dynamic torque, on the determined values for a desired value $Tq_{fw\_req}$ and/or a desired derivative $\dot{T}q_{fw\_req}$ for the dynamic torque and on the determined total delay time $t_{delay\_total}$. The control of the requested torque $Tq_{demand}$ here provides one or several of the desired value $Tq_{fw\_req}$ and the desired derivative $\dot{T}q_{fw\_req}$ for the dynamic torque.

Accordingly, with the use of the present invention, a control of the requested torque $Tq_{demand}$ is achieved, which improves the vehicle's performance and/or increases driver comfort, since an optimal value for the requested torque $Tq_{demand}$, from a performance point of view, which does not result in rocking the vehicle, may be determined. Prior art has controlled the static torque, which has caused powertrain oscillations in the vehicle. By using the present invention, the dynamic torque $Tq_{fw}$ may instead be controlled, in order for a desired value $Tq_{fw\_req}$ and/or a desired derivative $\dot{T}q_{fw\_req}$ for the dynamic torque to be achieved, which means that powertrain oscillations may be reduced considerably. The reduction in powertrain oscillations increases the driver comfort in the vehicle. In other words, a physical torque, which is the result of fuel being injected into the engine and the response by the powertrain due to its characteristics, is here controlled, this being the dynamic torque $Tq_{fw}$. The dynamic torque $Tq_{fw}$ therefore corresponds to the torque that is provided by the gearbox 103, which also may be expressed as the torque that is provided by a flywheel in the powertrain, whereat the influence from the powertrain such as the engine's acceleration and its effect, is comprised within the dynamic torque $Tq_{fw}$. Thus, a physical control of the dynamic torque $Tq_{fw}$ is achieved when the present invention is used.

The dynamic torque $Tq_{fw}$ may for example be controlled in order to achieve specific torque ramps/gradients, such as ramping down or up in connection with shift operations in the gearbox 103. The dynamic torque $Tq_{fw}$ may also be controlled in order to achieve desired specific torque values, which is useful for example for cruise control, that is the use of a cruise control device for the control of the speed of the vehicle, or for pedal driving, that is manual control of the vehicle speed. This may be expressed as desired values $Tq_{fw\_req}$ and/or desired derivatives $\dot{T}q_{fw\_req}$ for the dynamic torque being possible to achieve through the control according to the present invention.

The dynamic torque $Tq_{fw}$, provided by the engine 101 to its output shaft 102, may in one embodiment be determined based on a delayed requested engine torque $Tq_{demand\_delay}$, the rotational inertia of the engine $J_e$ and the rotational acceleration $\dot{\omega}_e$ of the engine 101.

The delayed requested engine torque a $Tq_{demand\_delay}$ has been delayed with a period of time $t_{inj}$ elapsing in order to execute an injection of fuel into the engine 101, i.e. the period of time it takes from the start of the injection until the fuel is ignited and combusted. This injection period is $t_{inj}$ typically known, but its length varies, for example for different engines and/or for different speeds in an engine. The dynamic torque $Tq_{fw}$ may here be determined as a difference between estimated values for a delayed requested engine torque $Tq_{demand\_delay}$ and the torque values $J_e\dot{\omega}_e$, comprising measured values for rotational acceleration $\dot{\omega}_e$ of the engine. In one embodiment, the dynamic torque $Tq_{fw}$ may therefore be represented by a signal difference between a signal for an estimated delayed requested engine torque $Tq_{demand\_delay}$, and the torque signal $J_e\dot{\omega}_e$ comprising measured values for rotational acceleration $\dot{\omega}_e$ of the engine.

The delayed requested engine torque $Tq_{demand\_delay}$ in one embodiment be defined as a net torque, meaning that losses and/or frictions are compensated, whereby a requested net engine torque and a delayed requested engine torque are achieved.

The dynamic torque $Tq_{fw}$, as provided by the motor 101 to its output shaft 102, thus corresponds, according to one embodiment, to the delayed requested engine torque $Tq_{demand\_delay}$ less a torque corresponding to the engine's rotational inertia $J_e$, multiplied with a rotational acceleration $\dot{\omega}_e$ for the engine 101, i.e. $Tq_{fw}=Tq_{demand\_delay}-J_e\dot{\omega}_e$, wherein the delayed requested engine torque $Tq_{demand\_delay}$ has been delayed by the injection time $t_{inj}$.

The rotational acceleration $\dot{\omega}_e$ for the engine 101 may here be measured by generating a time derivative of the engine speed $\omega_e$. The rotational acceleration $\dot{\omega}_e$ is then rescaled to a torque in accordance with Newton's second law, by being multiplied with the rotational inertia torque $J_e$ for the engine 101; $J_e\dot{\omega}_e$.

According to another embodiment, the dynamic torque $Tq_{fw}$ provided by the engine 101 may also be determined by the use of a torque sensor being placed at a suitable position along the vehicle's powertrain. Thus, a torque value measured by such a sensor may also be used in the feedback according to the present invention. Such a measured torque, which has been obtained by means of a torque sensor after the flywheel, i.e. somewhere between the flywheel and the driving wheels, corresponds to the physical torque that the dynamic engine torque $Tq_{fw}$ contributes. If a good a torque reporting may be achieved by means of the use of such a torque sensor, the torque sensor should thus provide a torque signal corresponding to the dynamic torque $Tq_{fw}$.

As is illustrated in FIG. 1, the different parts of the powertrain have different rotational inertias, comprising a rotational inertia $J_e$ for the engine 101, a rotational inertia $J_g$ for the gearbox 103, a rotational inertia $J_c$ for the clutch 106, a rotational inertia $J_p$ for the propeller shaft and rotational inertias $J_d$ for each drive shaft 104, 105. Generally speaking, all rotating bodies have a rotational inertia J, which depends on the mass of the body and the distance of the mass from the rotational center. For reasons of clarity, in FIG. 1, only the above mentioned rotational inertias have been added, and their significance for the present invention will be described hereafter. A person skilled in the art does, however, realize that more moments of inertia may occur in a powertrain than those listed here.

According to one embodiment of the present invention, the assumption is made that the rotational inertia $J_e$ of the engine 101 is much greater than other rotational inertias in the powertrain, and that the rotational inertia $J_e$ of the engine 101 therefore dominates a total rotational inertia J of the powertrain. That is $J=j_e+J_g+J_cJ_p+2J_d$, but as $J_e\gg J_g, J_e\gg J_c$, $J_e\gg J_p, J_e\gg J_d$ the total rotational inertia J of the powertrain is more or less equal to the rotational inertia $J_e$ of the engine 101; $J\approx J_e$ A non-limiting example for the values for these rotational inertias may be mentioned: $J_e=4$ kgm$^2$, $J_g=0.2$ kgm$^2$, $J_c=0.1$ kgm$^2$, $J_p=7*10^{-4}$ kgm$^2$, $J_d=5*10^{-5}$ kgm$^2$, which means that the assumption that the rotational inertia $J_e$ of the engine 101 dominates the total rotational inertia J of the powertrain; $J\approx J_e$; is correct, as the other parts of the powertrain are much easier to rotate compared with the engine 101. The aforementioned example values are values on the engine side of the gearbox, which means that they will vary along the drive shaft depending on the gear ratio used. Regardless which gear ratio is being used, the rotational inertia $J_e$ of the engine 101 is much greater than other rotational inertias, and therefore dominates the total rotational inertia J of the powertrain.

As the rotational inertia $J_e$ of the engine dominates the total rotational inertia J of the powertrain; $J\approx J_e$; the dynamic wheel torque $Tq_{wheel}$ corresponds to the dynamic torque $Tq_{fw}$ provided by the engine, multiplied with the gear ratio i, $Tq_{wheel}=Tq_{fw}*i$ for the powertrain. This considerably simplifies the control of the requested torque T $q_{demand}$ according to the present invention, as it is therefore very easy to determine the dynamic torque $Tq_{wheel}$ at the wheels. Hereby, the control of the requested torque $Tq_{demand}$ according to the present invention may continuously be adjusted to the dynamic torque $Tq_{wheel}$ provided to the wheels, which means that powertrain oscillations may be reduced significantly, or even be avoided completely. The engine torque $Tq_{demand}$ may then be requested in such a way that a desired dynamic torque $Tq_{wheel}$ is continuously provided at the wheels, which means that an even torque profile is achieved for the dynamic torque $Tq_{wheel}$ of the wheels, and that no oscillations occur for the wheels' torque profile, or that they have considerably lower amplitude than in prior art controlling of the requested engine torque $Tq_{demand}$.

The powertrain may be approximated as a relatively weak spring which may be described as:

$$Tq_{fw}=Tq_{demand\_delay}-J_e\dot{\omega}_{e=k}(\theta_e-\theta_{wheel})+c(\omega_e-\omega_{wheel}), \quad \text{(equation 1)}$$

where:
$\theta_e$ is an angle for the engine's output shaft 102, i.e. a total increase of the engine's performance since a starting point. For example, the angle $\theta_e$ may be 1000 revs, which corresponds to $1000*2\pi$ radians, if the engine has been running for a minute at the speed 1000 rpm;
$\omega_e$ is the time derivative of $\theta_e$, i.e. a rotational speed for the shaft 102;
$\theta_{wheel}$ is an angle for one or more of the driving wheels 110, 111, i.e. a total performance increase of the wheels since a starting point;
$\omega_{wheel}$ is the time derivative of $\sigma_{wheel}$, i.e. a rotational speed for the wheels;
k is a spring constant, which is related to a torque required for turning up the spring in order to achieve a certain gradient, for example in order to obtain a certain difference $\Delta\theta$ between $\theta_e$ and $\theta_{wheel}$. A low value for the spring constant k corresponds to a weak and swaying spring/powertrain;
c is a damping constant for the spring.
A derivation of equation 1 gives:

$$\dot{T}q_{fw}=k(\omega_e-\omega_{wheel})+c(\dot{\omega}_e-\dot{\omega}_{wheel}) \quad \text{(equation 2)}$$

It is reasonable to assume that the powertrain often may be considered as an undamped spring, i.e. that c=0, and that the spring constant k is dominated by the spring constant $k_{drive}$ for the drive shafts 104, 105, i.e. t,? $k_{drive/i}^2$ where i is the gear ratio. If c=0 then equation 2 is simplified as:

$$\dot{T}q_{fw}=k(\omega_e-\omega_{wheel}) \quad \text{(equation 3)}$$

As stated in equation 3, the derivative, that is the gradient, for the dynamic torque $Tq_{fw}$ may be considered to be proportional to the difference $\Delta\omega$ between the rotational speed $w_{wheel}$ for the wheels 110, 111 and the rotational speed $\omega_e$ of the engine/shaft 102.

This also means that a desired torque ramp $\dot{T}q_{fw\_req}$, that is a torque with a gradient, and which therefore changes in value over time, may be achieved by introducing a difference $\Delta\omega$ between the rotational speed $\omega_{wheel}$ of the wheels 110, 111 and the rotational speed $\omega_e$ of the engine/shaft 102; $\Delta\omega=\omega_e-\omega_{wheel}$:

$$\omega_{ref} = \omega_{wheel} + \frac{Tq_{fw\_req}}{k}; \qquad \text{(equation 4)}$$

where $\omega_{ref}$ is the reference rotational speed to be requested from engine 101 in order to achieve the torque ramp.

The difference $\Delta\omega$ in the rotational speed has above been described as a difference between the rotational speeds $\omega_{wheel}$ of the wheels 110, 111 and the rotational speed $\omega_e$ of the engine/shaft. However, it must be realized that the difference $\Delta\omega$ in more general terms may be described as a difference in rotational speed between a first end of the powertrain, rotating with a first rotational speed $\omega_1$, and a second end of the powertrain, rotating at a second speed $\omega_2$; $\Delta\omega=\omega_1-\omega_2$.

According to one embodiment of the present invention, the torque $Tq_{demand}$ to be requested from the engine 101 is determined, for example, by the fourth determining device 124, as the sum of the current value $Tq_{fw\_pres}$ for the dynamic torque and the total delay time $t_{delay\_total}$, multiplied by the desired derivative $\dot{T}q_{fw\_req}$ for the dynamic torque:

$$Tq_{demand}=Tq_{fw\_pres}+t_{delay\_total}\dot{T}q_{fw\_req}. \qquad \text{(equation 5)}$$

By using equation 5 when the requested torque $Tq_{demand}$ is determined, a desired derivative $\dot{T}q_{fw\_req}$, that is a desired gradient, for the dynamic torque may be achieved.

The desired derivative $\dot{T}q_{fw\_req}$ may also be expressed as:

$$\dot{T}q_{fw\_req} = \frac{Tq_{fw\_req} - Tq_{fw\_pres}}{\tau}. \qquad \text{(equation 6)}$$

The calibration parameter $\tau$ is related to a settling in period for the control/control device and has the time dimension. The calibration parameter $\tau$ may be set to a smaller value if a quicker settling is in desirable, and to a greater value if a slower settling in is desirable. $Tq_{fw\_req}$ is the desired value for the dynamic torque.

When equation 6 is used, a regulator providing a desired value $Tq_{fw\_req}$ for the dynamic torque may be created, which is described in more detail below.

According to one embodiment of the present invention, the requested torque $Tq_{demand}$ is determined by the fourth determining device 124, as the sum of the current value $Tq_{fw\_pres}$ for the dynamic torque and the total delay time $t_{delay\_total}$, multiplied with a quota between the desired value $Tq_{fw\_req}$ for the dynamic torque minus the current value $Tq_{fw\_pres}$ for the dynamic torque and a calibration parameter $\tau$:

$$Tq_{demand} = Tq_{fw\_pres} + t_{delay\_total}\frac{Tq_{fw\_req} - Tq_{fw\_pres}}{\tau}. \qquad \text{(equation 7)}$$

The calibration parameter $\tau$ is, as described above, related to a settling in period for the control/control device and has the time dimension.

With the use of equation 7, which uses the relationship in equation 6 when the requested torque $Tq_{demand}$ is determined, a desired value $Tq_{fw\_req}$ for the dynamic torque may be achieved.

According to one embodiment of the present invention, the requested torque $Tq_{demand}$ is determined by the fourth determining device 124, as the sum of the current value $Tq_{fw\_pres}$ for the dynamic torque, the total delay time $t_{delay\_total}$ multiplied by the desired derivative/gradient $\dot{T}q_{fw\_req}$ for the dynamic torque and a moment of inertia J for the powertrain, multiplied by an acceleration i geared with the gear ratio $\dot{\omega}_{wheel}$ for the at least one driving wheel 110, 111:

$$Tq_{demand}=Tq_{fw\_pres}+t_{delay\_total}\dot{T}q_{fw\_req}+J\dot{\omega}_{wheel} \qquad \text{(equation 8)}$$

The control according to equation 8 provides the desired derivative/gradient $\dot{T}q_{fw\_req}$ for the dynamic torque.

According to one embodiment of the present invention, the requested torque $Tq_{demand}$ is determined by the fourth determining device 124, as the sum of the current value $Tq_{fw\_pres}$ for the dynamic torque, the total delay time $t_{delay\_total}$, multiplied by a quota between the desired value $Tq_{fw\_req}$ minus the current value $Tq_{fw\_pres}$ for the dynamic torque, a calibration parameter $\tau$ related to a settling in time for the control, and a moment of inertia J for the powertrain, multiplied by an acceleration i geared by the gear ratio $\dot{\omega}_{wheel}$ for the at least one driving wheel 110, 111:

$$Tq_{demand} = Tq_{fw\_pres} + t_{delay\_total}\frac{Tq_{fw\_req} - Tq_{fw\_pres}}{\tau}J\dot{\omega}_{wheel}. \qquad \text{(equation 9)}$$

At the control according to equation 9, a desired value $Tq_{fw\_req}$ is provided for the dynamic torque. The calibration parameter $\tau$ is here related to a settling in period for the control/control device and has the time dimension. The calibration parameter $\tau$ may be set to a smaller value if a quicker settling in is desirable, and to a greater value if a slower settling in is desirable.

As described above, it may often be assumed that the rotational inertia $J_e$ of the engine 101 dominates the total rotational inertia J of the powertrain, that is to say $J \approx J_e$, as other parts of the powertrain are very easy to rotate in relation to the engine 101, in which case J may be replaced with $J_e$ in the equations 8 and 9.

The term $J\dot{\omega}_{wheel}$ in the equations 8 and 9 above is related to the acceleration of the vehicle $a_{vehicle}$ and the gear ratio i of the powertrain and the wheel radius $r_{wheel}$ of the driving wheels 110, 111 according to:

$$J\dot{\omega}_{wheel} = J\frac{a_{vehicle}i}{r_{wheel}}. \qquad \text{(equation 10)}$$

In this way, the control using the equations 8 and 9 may be corrected for the vehicle's acceleration. The requested torque $Tq_{demand}$ will here be differentiated from the current value $Tq_{fw\_pres}$ for the dynamic torque.

According to one embodiment of the present invention, feedback is also used in the control. Here, the control of the requested torque $Tq_{demand}$ is thus determined by the fourth determining device 124, based also on a feedback of a resulting actual value $\dot{T}q_{fw\_actual}$, corresponding to the desired derivative $\dot{T}q_{fw\_req}$. The requested torque $Tq_{demand}$ may then be determined according to:

$$Tq_{demand} = Tq_{fw\_pres} + t_{delay\_total} \frac{Tq_{fw\_req} - Tq_{fw\_pres}}{\tau} + \quad \text{(equation 11)}$$
$$J\dot{\omega}_{wheel} + t_{delay\_total}(\dot{T}q_{fw_{req}} - \dot{T}q_{fw\_actual})$$

By using the equation 11 in the control, a very exact control may be implemented, taking into consideration the result of the control, that is to say the resulting actual value $\dot{T}q_{fw\_actual}$ for the derivative of the dynamic torque.

The total delay time $t_{delay\_total}$, corresponding to the time elapsing from a determining of at least one parameter value until a change in the dynamic torque $Tq_{fw}$, based on the determined at least one parameter value, has been performed, may comprise one or more of a range of times. The parameter value may e.g. be the engine's speed/acceleration, which is related to the dynamic torque $T_{qfw\_pres}$, or the wheel speed/wheel acceleration, both of which impact the control according to equation 11. The parameter value may also be the flywheel torque, which is also related to the dynamic torque.

Considering the total delay time $t_{delay\_total}$, as is implemented in the present invention, means that a more exact control may be performed, as the delay is considered and as the value for the dynamic torque $Tq_{fw}$ changes over time. Each measure may then be executed exactly at the point in time when it is needed, in order to optimally adjust the requested torque $Tq_{demand}$. In other words, the awareness of the delay time is used, in order to more exactly and at the right time be able to perform controlling of the requested torque $Tq_{demand}$, so that a comfortable and efficient control is achieved, which reduces the powertrain oscillations.

If the parameter value is measured, the total delay time $t_{delay\_total}$ may comprise a measuring time $t_{measure}$, elapsing in order to determine at least one parameter based on at least one measurement, which may comprise processing of measurements, such as averaging. The measuring time $t_{measure}$ may also depend on where in the vehicle a sensor that is used is located.

If, instead, the parameter value is estimated, the total delay time $t_{delay\_total}$ may comprise an estimating time $t_{estimate}$, elapsing in order to determine at least one parameter value based on at least one estimate, for example comprising a time, which elapses in order to perform calculations comprised in the estimate.

The total delay time $t_{delay\_total}$ may also comprise a communication time $t_{com}$, elapsing in order to transfer signals that are used in the controlling between devices in the vehicle, such as delays imposed by a CAN bus (Controller Area Network bus) or similar in the vehicle.

The total delay time $t_{delay\_total}$ may also comprise a filter time $t_{filter}$, comprising filter delays for filterings performed during measurements and/or estimates of parameter values and/or for control according to the invention.

The total delay time $t_{delay\_total}$ may also comprise a calculation time $t_{comp}$, elapsing in order to perform calculations relating to the control according to the present invention.

The total delay time $t_{delay\_total}$ may also comprise a torque execution time $t_{torque\_response}$, elapsing from a torque request being made until an engine speed change corresponding to this torque request occurs. The above mentioned injection time $t_{inj}$ may here be included in the torque execution time $t_{torque\_response}$. The torque execution time $t_{torque\_response}$ may vary depending on the engine speed.

According to one embodiment of the present invention, $t_{delay\_total}$ corresponds to the value $(1.9+1.5)ti_{cyl}$, where $1.9ti_{cyl}=1.5ti_{cyl}+ti_{pre\_calc}$;

$1.5ti_{cyl}=t_{rpmfilter}$;

$ti_{cyl}$ is the cylinder time, in other words the time between two corresponding events, for example the ignition or the injection, taking place in two subsequent cylinders. $ti_{cyl}$ depends on the engine speed, $ti_{cyl}=120/$ (varvtal*antal cylindrar), for example $ti_{cyl}=20/$varvtal for engines with 6 cylinders;

$ti_{pre\_calc}$ is the time before the injection itself, during which the torque for the next combustion is determined; and $t_{rpmfilter}$ is the delay time that the filtration of the speed signal provides. For a FIR filter (Finite Impulse Response filter), for example, this delay may be $1.5ti_{cyl}$.

As described above, according to the present invention, the control of the requested torque $Tq_{demand}$ provides a desired value $Tq_{fw\_req}$ and/or a desired derivative $\dot{T}q_{fw\_req}$ for the dynamic torque, either individually or in combination.

Thus, the control may be effected towards a specific, and at least partly static, desired value $Tq_{fw\_req}$ for the dynamic torque. This dynamic torque $Tq_{fw\_req}$ may then, for example, be related to and/or have as its objective to reduce powertrain oscillations in the vehicle at cruise control or pedal driving in the vehicle, whereby an increased driver and/or passenger comfort is achieved.

The dynamic torque $Tq_{fw\_req}$ may also be related to and/or have as its objective to achieve an automatic play management in the vehicle 100, which may for example be advantageous at cruise control near the powertrain play.

The dynamic torque $Tq_{fw\_req}$ may also be related to and/or have as its objective to achieve a component protection for one or several components in the vehicle. For example, the gearbox 103 may be protected against harmful torque spikes, which may have been caused by the driver and/or the environment around the vehicle, for example because of an uneven road surface, powertrain oscillations, and/or because of skidding and subsequent gripping of the driving wheels on the road. Sudden gripping after a skidding of the driving wheels may give rise to substantial torque spikes.

The control may also occur in the direction towards a desired gradient/change/derivative $\dot{T}q_{fw\_req}$ for the dynamic torque. The desired derivative $\dot{T}q_{fw\_req}$ for the dynamic torque may be related to a driving mode used in the vehicle. Several such driving modes are defined for vehicles, for example an economic driving mode (ECO), a powerful driving mode (POWER) and a normal driving mode (NORMAL). The driving modes define, for example, how aggressively the vehicle will behave and what feeling the vehicle will convey when being driven, wherein this aggression is related to the derivative $\dot{T}q_{fw\_req}$ for the dynamic torque.

The desired derivative $\dot{T}q_{fw\_req}$ for the dynamic torque may be related to a calibration of at least one parameter, which is related to a risk for jerkiness of the powertrain. For example, a maximum value $\dot{T}q_{fw\_req\_max}$ for the desired derivative may be calibrated to a value compensating for jerks in the powertrain when relatively large changes in the requested torque occur, for example when an accelerator pedal is depressed or released relatively quickly.

The desired derivative $\dot{T}q_{fw\_req}$ for the dynamic torque may be related to, and have as its objective, a ramping down prior to and/or after a shift operation in the gearbox 103, or a ramping up before and/or after a shift operation in the gearbox.

The desired derivative $\dot{T}q_{fw\_req}$ for the dynamic torque may be related to, and have as its objective, a ramping down before the release of a clutch 106, or a ramping up after the engaging of the clutch 106.

According to one embodiment according to the present invention, the control of the requested torque $Tq_{demand}$ provides a combination of a desired value $Tq_{fw\_req}$ and a desired derivative $\dot{T}q_{fw\_req}$ for the dynamic torque. Accordingly, the dynamic torque may be controlled towards a special level $Tq_{fw\_req}$, while at the same time controlling the derivative $\dot{T}q_{fw\_req}$. Thus, the control towards the special value $Tq_{fw\_req}$ may be conditional upon the control towards such special value $Tq_{fw\_req}$ being required to follow a certain derivative $\dot{T}q_{fw\_req}$. This may guarantee that the dynamic torque reaches a desired and suitable level $Tq_{fw\_req}$, while at the same time the vehicle may be driven with a desirable feeling/comfort for the duration of the control working to reach the desired and suitable level $Tq_{fw\_req}$.

Figure 3:
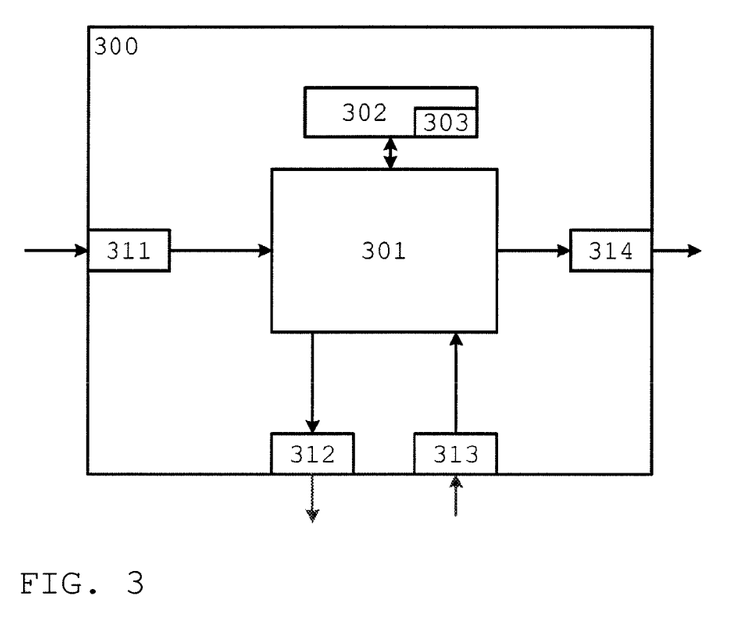
FIG. 3 shows a control device, in which a method according to the present invention may be implemented.

A person skilled in the art will realize that a method for the control of a requested torque $Tq_{demand}$ according to the present invention, may also be implemented in a computer program, which when executed in a computer will cause the computer to carry out the method. The computer program usually consists of a part of a computer program product 303, where the computer program product comprises a suitable digital storage medium on which the computer program is stored. Said computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

FIG. 3 schematically shows a control device 300. The control device 300 comprises a calculation unit 301, which may consist of substantially a suitable type of processor or microcomputer, e.g. a circuit for digital signal processing (Digital Signal Processor, DSP), or a circuit with a predetermined specific function (Application Specific Integrated Circuit, ASIC). The calculation unit 301 is connected to a memory unit 302, installed in the control device 300, providing the calculation device 301 with e.g. the stored program code and/or the stored data, which the calculation device 301 needs in order to be able to carry out calculations. The calculation unit 301 is also arranged to store interim or final results of calculations in the memory unit 302.

Further, the control device 300 is equipped with devices 311, 312, 313, 314 for receiving and sending of input and output signals. These input and output signals may contain wave shapes, pulses, or other attributes, which may be detected as information by the devices 311, 313 for the receipt of input signals, and may be converted into signals that may be processed by the calculation unit 301. These signals are then provided to the calculation unit 301. The devices 312, 314 for sending output signals are arranged to convert the calculation result from the calculation device 301 into output signals for transfer to other parts of the vehicle's control system and/or the component(s) for which the signals are intended, for example to the engine.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation unit 301, and that the above-mentioned memory may consist of the memory unit 302.

Generally, control systems in modern vehicles consist of a communications bus system, consisting of one or several communications buses to connect a number of electronic control devices (ECUs), or controllers, and different components localised on the vehicle. Such a control system may comprise a large number of control devices, and the responsibility for a specific function may be distributed among more than one control device. Vehicles of the type shown thus often comprise significantly more control devices than shown in FIGS. 1 and 3, as is well known to a person skilled in the art within the technology area.

The present invention, in the embodiment displayed, is implemented in the control device 300. The invention may, however, also be implemented wholly or partly in one or several other control devices, already existing in the vehicle, or in a control device dedicated to the present invention.

Figure 4A:
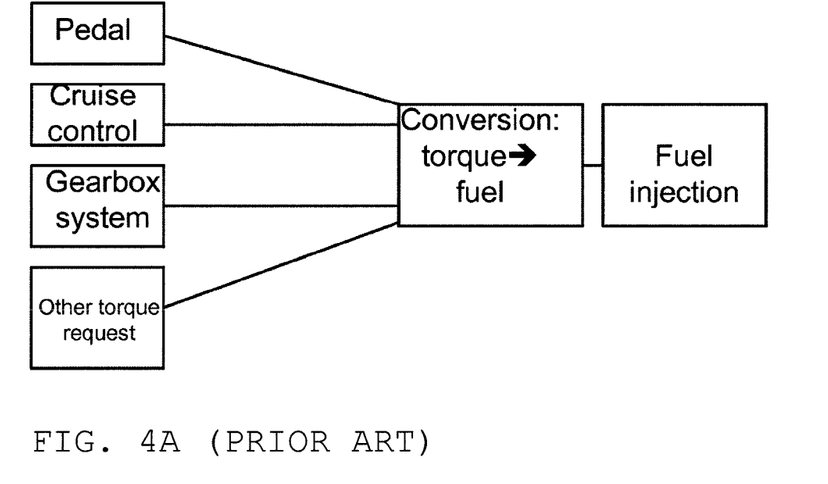
FIGS. 4A-B schematically show block diagrams for prior art fuel injection systems and for fuel injection systems comprising a control system according to the present invention.
Figure 4B:
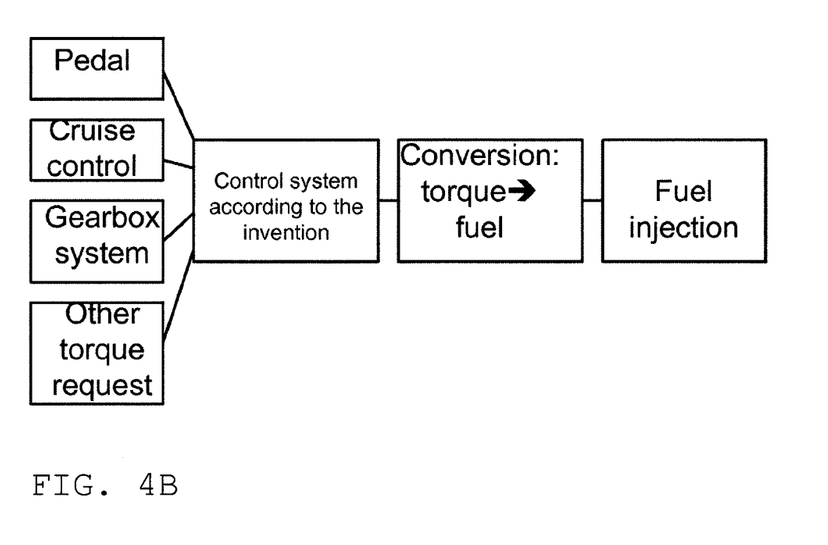

FIGS. 4A-B show a schematic block diagram for a prior art fuel injection system (FIG. 4A) and a fuel injection system comprising a control system according to the present invention (FIG. 4B).

In order to determine how much fuel to inject into the engine, information/indications of the torque requested have been used in vehicles for a long time, such as, for example, signals and/or mechanical indications from, for example a driver-controlled accelerator pedal, a cruise control and/or a shifting system. The amount of fuel to be injected into the engine is then calculated based on the information/indications. In other words, a direct re-interpretation/conversion of the information/indication into a corresponding amount of fuel is carried out. This fuel is then injected into the cylinders of the engine in order to operate the engine. This prior art procedure is shown schematically in FIG. 4B. Thus, using prior art, a direct transfer of the information/indication from, for example, the accelerator pedal to the static torque achieved by the fuel injection is received and used. In other words, for example the indication from the accelerator pedal $Tq_{from\_acc\_pedal}$, is here directly used to calculate the requested torque $Tq_{demand}$; $Tq_{demand} = Tq_{from\_acc\_pedal}$.

When the present invention is used in the fuel injection system, a control device/control system is introduced, as illustrated in FIG. 4B, i.e. the system according to the present invention, which is arranged for the control of a torque $Tq_{demand}$ requested from the engine in a vehicle, between the accelerator pedal, the cruise control and/or the shifting system and the conversion of the torque to fuel. Thus, the regulator/control system, which achieves the requested/desired behaviour/profile for the dynamic torque, is comprised in this system according to the present invention. It is thus this dynamic torque which is calculated/converted to the amount of fuel to be injected into the engine during combustion. In other words, the indication from the accelerator pedal $Tq_{from\_acc\_pedal}$ is here first transformed into a torque request for the dynamic torque, for example by means of the use of equation 7, with the indication from the accelerator pedal $Tq_{from\_acc\_pedal}$ introduced into the equation:

$$Tq_{demand} = Tq_{fw\_pres} + t_{delay\_total} \frac{Tq_{from\_acc\_pedal} - Tq_{fw\_pres}}{\tau},$$

where at fuel corresponding to this speed request $Tq_{demand}$ will be injected into the engine. The other above mentioned control equations could also have been used in the same manner, as the person skilled in the art will realise. This means that the current dynamic torque $Tq_{fw\_pres}$ according to the present invention is controlled towards the indication from the accelerator pedal $Tq_{from\_acc\_pedal}$. When the present invention is used, the accelerator pedal, the cruise control, the shift system or another possible speed requester may be used, in order to request and/or provide a dynamic torque, rather than the static torque requested in prior art systems (FIG. 4A).

Figure 5A:
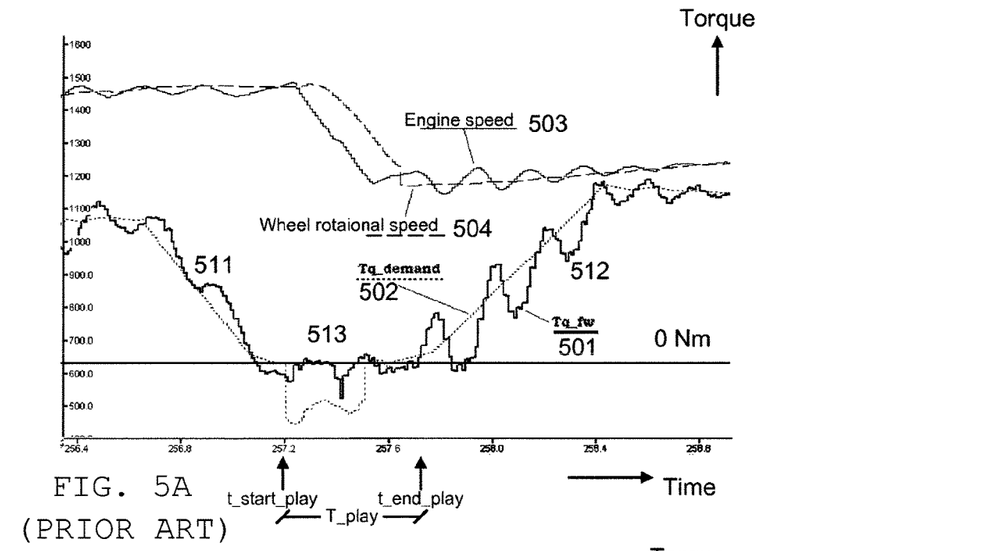
FIGS. 5A-B show driving modes comprising a shift operation when a prior art control is applied, and when a control according to this invention is applied, respectively.
Figure 7A:
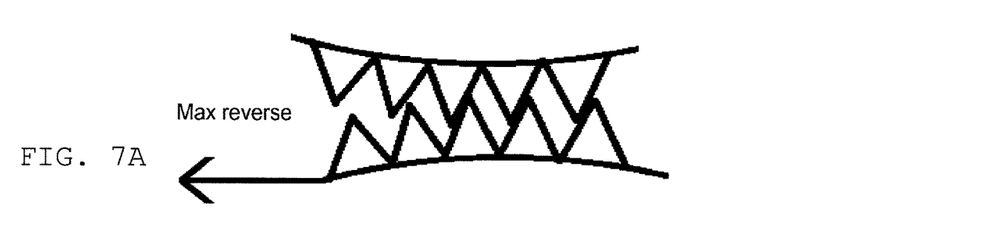
FIGS. 7A-C schematically illustrate a play in the powertrain.
Figure 7B:
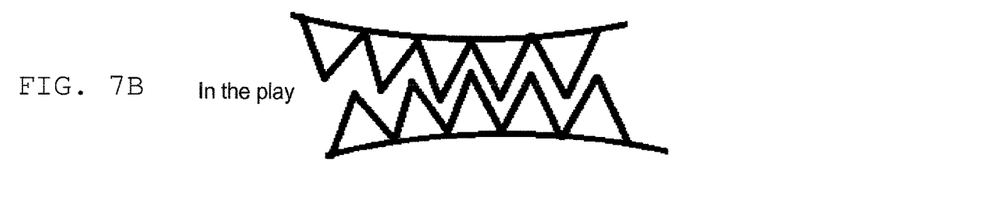
Figure 7C:
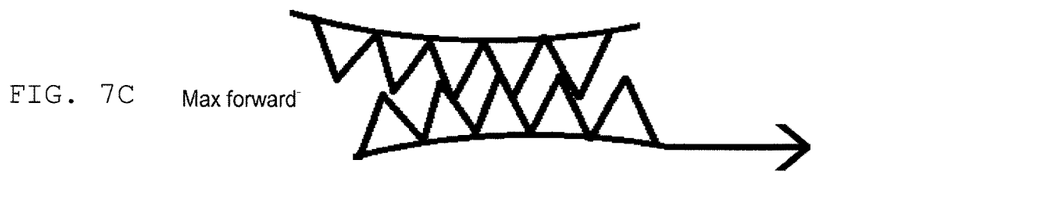

A few driving modes will be illustrated below with the help of FIGS. FIG. 5a shows a prior art control, wherein a static torque speed request is made for a driving mode, which may for example correspond to/comprise a shift operation in the vehicle. Here, the dynamic torque $Tq_{fw}$ 501 (solid line) thus has to be reduced 511 to the play 513 at the speed 0 Nm, wherein, for example, a shift operation may take place, in order to later be increased 512 again. When the powertrain is in the time period $T_{glapp}$, during which the play in the powertrain prevails, the engine does not provide a dynamic torque $Tq_{fw}$ to the driving wheels. There are a number of possible plays that may occur in a powertrain, for example when cogwheels in gears, UV joints or similar do not properly engage at certain reciprocal angles. As mentioned above, a plat may, for example, occur at a transition between dragging the engine and an acceleration/torque request, when engaging the clutch, or during a shift operation. The position of the cogwheels in relation to each other during and outside of the play is schematically illustrated in the FIGS. 7A-C. The cogs in the cog wheels make contact in a first shaft position, during rotation in a first direction, as illustrated in FIG. 7A, in a position corresponding to a maximum backward turn. The cogs in the cog wheels make contact in a second shaft position, during rotation in a second direction, as illustrated in FIG. 7C, in a position corresponding to a maximum forward turn. Therefore, the cogs are engaged in both these positions (FIGS. 7A and 7C respectively), which also means that the play is rotated backwards and forwards respectively. The play for the powertrain is made up of the angle between the first and second shaft position, wherein the cogs are not engaged, i.e. in a position corresponding to a turning of the play, illustrated in FIG. 7B, between the times $t_{start\_glapp}$ and $t_{slut\_glapp}$. Therefore, no torque is transferred during the play.

One way to determine the size of the play angle $\theta_{glapp}$ is by means of physically turning a shaft in the powertrain, for example the gearbox input shaft 109 or the gearbox output shaft 107. If the input shaft 109 is turned, the play of the entire powertrain is included, that is plays in all gears such as in the gearbox, the final gear 108 and any other gears in the powertrain are included. If instead the output shaft 107 is turned, then only plays after the gearbox are included, i.e. the play in the final gear is included, but the play in the gearbox is excluded. Therefore, turning the gearbox input shaft 109 provides a more comprehensive idea of the play. However, it may here be noted that the play of the final gear often dominates the play in the powertrain, and is also geared to the engine with the gear position in the gearbox, why turning the output shaft 107 in some cases provides a sufficient accuracy when determining the play angle.

When turning, the point at which the cogs engage ("max backwards" or "max forwards") and release each other ("in the play"), respectively, is registered, which provides the first and the second gear position at the start and the end of the play, respectively. This turning and registration of the size $\theta_{glapp}$ of the play angle may advantageously be carried out for the different gear positions in the gearbox. The determining of the size $\theta_{glapp}$ of the play angle may, for example, be performed in connection with the assembly of the vehicle, i.e. before it is commissioned, but may also be done after it has been commissioned.

Once the size $\theta_{glapp}$ of the play angle has been determined, for example for each of the gears in the gearbox, the size $\theta_{glapp}$ of the play angle may be stored in a memory, for example in control device 120 in the vehicle.

According to one embodiment of the present invention, the size $\theta_{glapp}$ of the play angle is determined by means of calculations based on one or more rotational speed differences $\Delta\omega$ during one or more plays, whereat the size $\theta_{glapp}$ of the play angle may be calculated as an integration, or a corresponding sum, of the rotational speed difference $\Delta\omega$ across the play; $\theta_{glapp} = \int_{t_{start\_glapp}}^{t_{slut\_glapp}} \Delta\omega$. This size $\theta_{glapp}$ may here, for example, be calculated several times for one or more plays, whereafter an averaging, or similar, of the calculated values provides a final value for the size $\theta_{glapp}$.

The graph 501 shows the dynamic torque $Tq_{fw}$, which is the result of the control. The graph 502 (dotted line graph) shows the requested torque $Tq_{demand}$. The graph 503 (line graph) shows the rotational speed $\omega_e$ of the engine. The graph 504 (dash) shows the rotational speed $\omega_{wheel}$ of the wheels.

In FIGS. 5A-B and 6A-B, the engine speed is shown on the left y-axis. The torque graph has an increasing value upwards, which is indicated by the arrow on the right side of the FIG. The torque 0 Nm (the play) is marked by the horizontal line in the FIG. Time is shown in the x-axis.

The dynamic torque $Tq_{fw}$ must here be ramped down to 0 Nm with a specific derivative, and subsequently synchronisation of the engine speed and the shift operation itself is performed. The requested torque $Tq_{demand}$ is then ramped up to a relatively high level again, for example to a value determined by the driver or the cruise control. It is evident from the FIG. that the resulting dynamic torque $Tq_{fw}$ 501 does not correspond to the requested torque's $Tq_{demand}$ even and non-oscillating graph 502. Instead the dynamic torque $Tq_{fw}$ 501 oscillates heavily, in particular during the ramping up 512 but also during the ramping down 511, which will be experienced as very uncomfortable for the driver and/or the passengers of the vehicle.

Figure 5B:
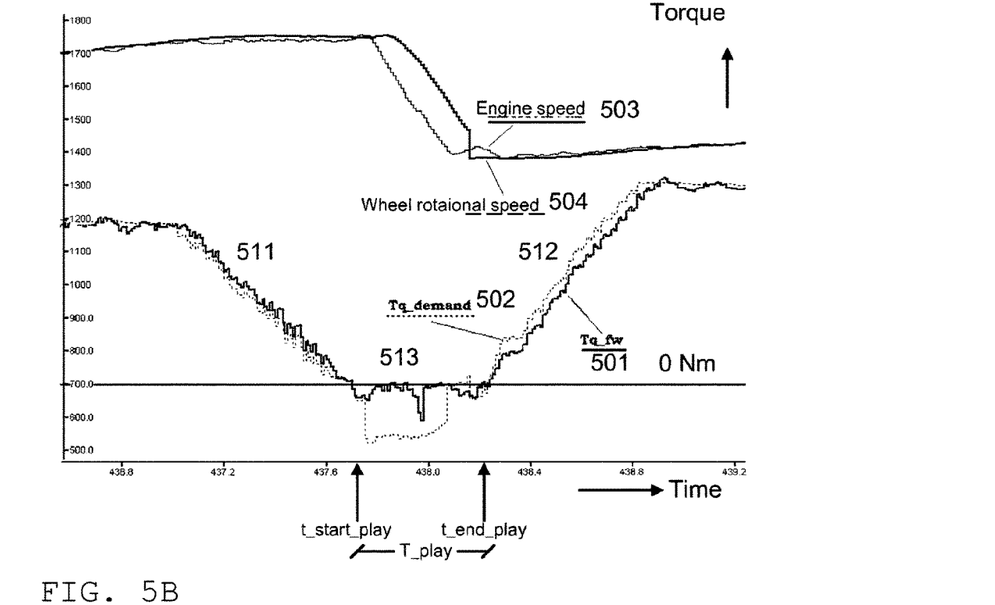

FIG. 5B shows a control according to an embodiment of the present invention, wherein a dynamic torque request is implemented for a driving mode, which may for example correspond to/comprise a shift operation in the vehicle, corresponding to the one illustrated in FIG. 5A. Here, the dynamic torque $Tq_{fw}$ 501 (line graph) is to be reduced 511 to the play 513 at the speed 0 Nm, where, for example, a shift operation may take place, in order later to be increased 512 again. The graph 501 shows the dynamic torque $Tq_{fw}$, which is the result of the control. The graph 502 (dotted line graph) shows the requested torque $Tq_{demand}$. The graph 503 (line graph) shows the rotational speed $\omega_e$ of the engine. The graph 504 (dash) shows the rotational speed $\omega_{wheel}$ of the wheels. According to the present invention, the requested torque $Tq_{demend}$ is allowed to vary considerably more than in the static torque request as per prior art, and as illustrated in FIG. 4A. This means that the requested torque $Tq_{demand}$ has a somewhat jagged and uneven profile in FIG. 5B. This is permitted according to the present invention, as the focus of the control is on providing the dynamic torque $Tq_{fw}$ 501 with a substantially even and non-oscillating form. As is evident from FIG. 5B, the result of the control also is that the dynamic torque $Tq_{fw}$ 501 oscillates considerably less, i.e. that is has considerably less amplitude, than the dynamic torque $Tq_{fw}$ 501 as per prior art control in FIG. 5A. In particular, these differences in control are evident from the ramping up 512, which under prior art, in FIG. 5A, provides a severely, i.e. with great amplitude, oscillating dynamic torque $Tq_{fw}$ 501, whilst the oscillating dynamic torque $Tq_{fw}$ 501 according to the present invention, in FIG. 5B, achieves a substantially non-oscillating profile. Therefore, greater comfort and better performance is achieved through the use of the present invention.

Figure 6A:
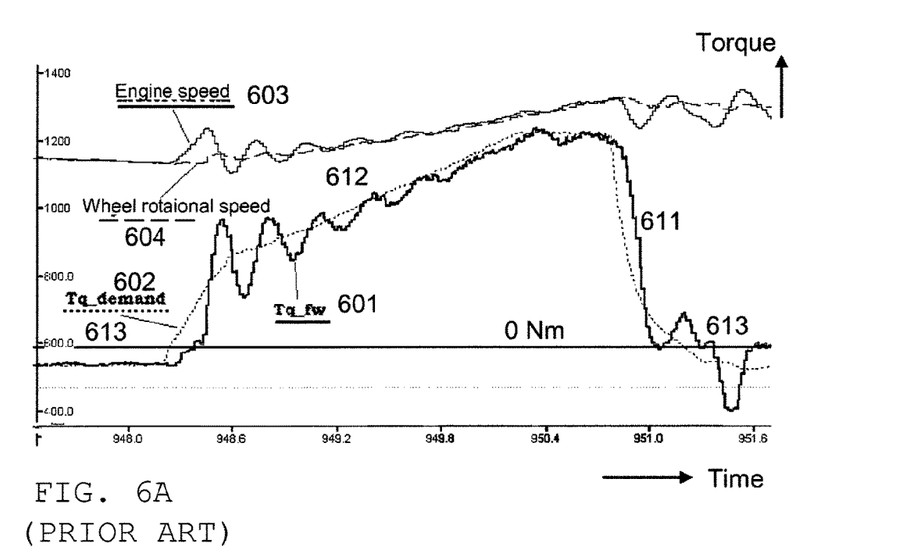
FIGS. 6A-B show driving modes comprising a torque request when a prior art control is applied, and when a control according to this invention is applied, respectively.

FIG. 6A shows a control according to prior art technology, wherein a static torque request is used in a driving mode comprising a start of a request for torque from the engine, a so-called "TIPIN" and a stop of a request for torque from the engine, a so-called "TIPOUT", which may for example be the result of a driver pressing down and releasing, respectively, an accelerator pedal in the vehicle. According to prior art technology, an amount of fuel corresponding to the static torque request is calculated directly, following which injection into the engine's cylinders is carried out. The graph 601 (line graph) shows the dynamic torque $Tq_{fw}$ resulting from the control. The graph 602 (dotted line graph) shows the requested torque $Tq_{demand}$. Powerful oscillations with a high amplitude, especially at ramping up 612 or ramping down, for example in connection with the play 613 at the torque 0 Nm, is the result of this control. The graph 603 (line graph) shows the rotational speed $\omega_e$ of the engine. The graph 604 (dash) shows the rotational speed $\omega_{wheel}$ of the wheels. The resulting dynamic torque $Tq_{fw}$ 601 does not correspond to the requested torque's $Tq_{demand}$ relatively even and non-oscillating graph 602. Instead the dynamic torque $Tq_{fw}$ 601 oscillates heavily, which will be experienced as very uncomfortable for the driver and/or the passengers of the vehicle.

Figure 6B:
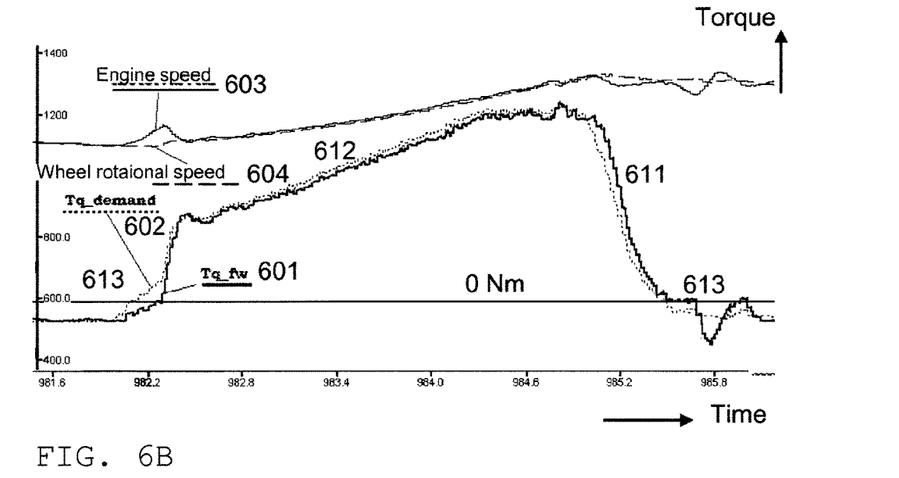

FIG. 6b shows a control according to an embodiment of the present invention, wherein a dynamic torque request is implemented for a driving mode illustrated in FIG. 6A. The graph 601 (line graph) shows the dynamic torque $Tq_{fw}$ resulting from the control. The graph 602 (dotted line graph) shows the requested torque $Tq_{demand}$. The graph 603 (line graph) shows the rotational speed $\omega_e$ of the engine. The graph 604 (dash) shows the rotational speed $\omega_{wheel}$ of the wheels. According to the present invention, the requested torque $Tq_{demand}$ is allowed to vary considerably more than in the static torque request as per prior art, and as illustrated in FIG. 6A. This means that the requested torque $Tq_{demand}$ has a somewhat jagged and uneven profile in FIG. 6B. This is permitted according to the present invention, as the focus of the control is on providing the dynamic torque $Tq_{fw}$ 601 with a substantially even and non-oscillating form. As is evident from FIG. 6B, the result of the control is also that the dynamic torque $Tq_{fw}$ 601 oscillates considerably less, that is to say it has considerably smaller amplitude than the dynamic torque $Tq_{fw}$ 601, as per prior art controls in FIG. 6A. In particular, these differences in control are evident from the ramping up 612 from the play 613, which under prior art provides a severely, i.e. with great amplitude, oscillating dynamic torque $Tq_{fw}$ 602, whilst the oscillating dynamic torque $Tq_{fw}$ 602 according to the present invention, in FIG. 6B, achieves a substantially non-oscillating profile. Also at ramping down 611, the amplitude of the oscillations drops considerably with the present invention. Therefore, greater comfort and better performance is achieved through the use of the present invention.

In this document, devices are often described as being arranged to carry out steps in the method according to the invention. This also comprises that the devices are adapted and/or set up to carry out these method steps.

The present invention is not limited to the embodiments of the invention described above, but relates to and comprises all embodiments within the protected scope of the enclosed independent claims.

The invention claimed is:

1. A system for controlling a torque requested from an engine in a vehicle the system comprising:
    a determining device configured to determine the requested torque based on at least:
    a current value for a dynamic torque;
    at least one of a desired value and a desired derivative for the dynamic torque; and
    a total delay time required from a determination of at least one parameter value until a change of the dynamic torque is completed, wherein the change of the dynamic torque is completed based on the determined at least one parameter value; and
    an execution device is configured to provide, through the control of the requested torque the at least one of the desired value and the desired derivative for the dynamic torque,
    wherein the engine provides the dynamic torque for an output shaft of the engine in response to the requested torque, and the dynamic torque for the output shaft of the engine is related via a gear ratio to a dynamic wheel torque provided to at least one driving wheel of the vehicle via a power train of the vehicle.

2. A system according to claim 1, wherein the execution device is configured to determine the at least one parameter value based on at least one measurement and/or at least one estimation of the parameter value.

3. A system according to claim 1, wherein the total delay time comprises at least one selected from the group consisting of:
    a measuring time, elapsing to determine the at least one parameter value based on at least one measurement;
    an estimation time, elapsing to determine at least one parameter value based on at least one estimation;
    a communication time, elapsing to transfer signals that are used in the controlling between devices in the vehicle;
    a filtering time, which comprises filter delays;
    a calculation time, elapsing to perform calculations related to the control; and
    a torque execution time, elapsing from the request for a torque until an engine speed change corresponding to the torque request occurs.

4. A system according to claim 1, wherein the determining device is configured to determine the requested torque as a sum of the current value for the dynamic torque and the total delay time multiplied by the desired derivative for the dynamic torque, such that $$Tq_{demand}=Tq_{fw\_pres}+t_{delay\_total}\dot{T}q_{fw\_reg},$$

wherein the desired derivative is provided for the dynamic torque.

5. A system according to claim 1, wherein the determining device is configured to determine the requested torque as a sum of the current value for the dynamic torque and the total delay time multiplied by a quota between the desired value minus the current value for the dynamic torque, and a calibration parameter related to a settling in time for the control, such that $$Tq_{demand} = Tq_{fw\_pres} + t_{delay\_total}\frac{Tq_{fw\_req} - Tq_{fw\_pres}}{\tau},$$

wherein the desired value is provided for the dynamic torque.

6. A system according to claim 1, wherein the determining device is configured to determine the requested torque as a sum of the current value for the dynamic torque, the total delay time, multiplied by a desired derivative for the dynamic torque, and a moment of inertia for the powertrain, multiplied with an acceleration geared with the gearing ratio for the at least one driving wheel, such that $$Tq_{demand}=Tq_{fw\_pres}+t_{delay\_total}\dot{T}q_{fw\_reg}+J\dot{\omega}_{wheel},$$

wherein the desired derivative is provided for the dynamic torque.

7. A system according to claim 1, wherein the determining device is configured to determine the requested torque as a sum of the current value for the dynamic torque, the total delay time, multiplied by a quota between the desired value minus the current value for the dynamic torque, a calibration parameter related to a settling in time for the control, and a moment of inertia for the powertrain, multiplied by an acceleration geared with the gearing ratio for the at least one driving wheel, such that $$Tq_{demand} = Tq_{fw\_pres} + t_{delay\_total}\frac{Tq_{fw\_req} - Tq_{fw\_pres}}{\tau} + J\dot{\omega}_{wheel},$$

wherein the desired value is provided for the dynamic torque.

8. A system according to claim 1, wherein the determining device is configured to perform the control of the requested torque, based also on a feedback of a resulting actual value corresponding to the desired derivative.

9. A system according to claim 1, wherein the desired derivative for the dynamic torque is related to one or more of the group consisting of:
a driving mode for the vehicle; and
a calibration of at least one parameter related to a risk for jerkiness in a powertrain in vehicle;
a ramping down prior to a shift operation in a gearbox in the vehicle;
a ramping down prior to disconnection of a clutch in the vehicle;
a ramping up after a shift operation in a gearbox in the vehicle; and
a ramping up after engaging a clutch in the vehicle.

10. A system according to claim 1, wherein the desired dynamic torque is related to one or more of the group consisting of:
a reduction of powertrain oscillations in the vehicle;
an automatic play management in the vehicle; and
a component protection for one or several components in the vehicle.

11. A system according to claim 1, wherein the determining device is configured to perform the control to achieve a combination of the desired value and the desired derivative for the dynamic torque.

12. A method of controlling a torque requested from an engine in a vehicle, the method comprising:
determining at least one parameter value;
determining the requested torque at least based on:
a current value for the dynamic torque;
at least one of a desired dynamic torque value, and a desired derivative for the dynamic torque; and
a total delay time required from the determined at least one parameter value until a change of the dynamic torque is complete based on the determined at least one parameter value,
wherein the determined requested torque achieves one or more of the desired value and the desired derivative for the dynamic torque; and providing the dynamic torque to an output shaft of the engine in response to the requested torque,
wherein the dynamic torque is related through the gear ratio to the dynamic wheel torque provided by a powertrain to at least one driving wheel of the vehicle.

13. A method according to claim 12, wherein the total delay time comprises at least one from among the group consisting of:
a measuring time, elapsing in order to determine the at least one parameter value, based on at least one measurement of time;
an estimation time, elapsing in order to determine at least one parameter value, based on at least one estimation;
a communication time, elapsing in order to transfer signals that are used in the controlling between devices in the vehicle;
a filtering time, which comprises filter delays;
a calculation time, elapsing in order to perform calculations related to the control; and
a torque execution time, elapsing from the request for a torque until an engine speed change corresponding to the torque request occurs.

14. A method according to claim 12, further comprising, determining the requested torque as the sum of the current value for the dynamic torque and the total delay time, multiplied by the desired derivative for the dynamic torque, such that $$Tq_{demand}=Tq_{fw\_pres}+t_{delay\_total}\dot{T}q_{fw\_reg},$$

wherein the desired derivative is provided for the dynamic torque.

15. The method according to claim 12, further comprising, determining the requested torque as a sum of the current value for the dynamic torque and the total delay time, multiplied by a quota between the desired value minus the current value for the dynamic torque, and a calibration parameter related to a settling in time for the control, such that $$Tq_{demand} = Tq_{fw\_pres} + t_{delay\_total}\frac{Tq_{fw\_req} - Tq_{fw\_pres}}{\tau},$$

wherein the control is providing the desired value for the dynamic torque.

16. A method according to claim 12, further comprising, determining the requested torque as a sum of the current value for the dynamic torque, the total delay time, multiplied by the desired derivative for the dynamic torque, and a moment of inertia for the powertrain, multiplied by an acceleration geared with the gearing ratio for the at least one driving wheel, such that $$Tq_{demand}=Tq_{fw\_pres}+t_{delay\_total}\dot{T}q_{fw\_reg}+J\dot{\omega}_{wheel},$$

wherein the control is providing the desired derivative for the dynamic torque.

17. A method according to claim 12, further comprising, determining the requested torque as a sum of the current value for the dynamic torque, the total delay time, multiplied by a quota between the desired value minus the current value for the dynamic torque, a calibration parameter related to a settling in time for the control, and a moment of inertia for the powertrain, multiplied by an acceleration geared with the gearing ratio for the at least one driving wheel, such that $$Tq_{demand} = Tq_{fw\_pres} + t_{delay\_total} \frac{Tq_{fw\_req} - Tq_{fw\_pres}}{\tau} + J\dot{\omega}_{wheel},$$

wherein the controlling provides the desired value for the dynamic torque.

18. A method according to claim 12, wherein the desired derivative for the dynamic torque is related to one or more of the group consisting of:
- a driving mode for the vehicle;
- a calibration of at least one parameter related to a risk for jerkiness in a powertrain in the vehicle;
- a ramping down prior to a shift operation in a gearbox in the vehicle;
- a ramping up prior to a shift operation in a gearbox in the vehicle;
- a ramping down prior to disconnection of a clutch in the vehicle;
- a ramping up after a shift operation in a gearbox in the vehicle;
- a ramping down after a shift operation in a gearbox in the vehicle and
- a ramping up after engaging a clutch in the vehicle.

19. A non-volatile computer readable medium product comprising computer code recorded on the medium, such that when the computer code is executed in a computer, the computer code causes the computer to perform the method according to claim 12.

* * * * *